United States Patent
Matsumoto et al.

(10) Patent No.: US 6,480,971 B1
(45) Date of Patent: Nov. 12, 2002

(54) MEDIA LIBRARY APPARATUS AND METHOD OF CONTROLLING THE MEDIA LIBRARY APPARATUS

(75) Inventors: Tadashi Matsumoto, Hadano (JP); Hiroyuki Suzuki, Hadano (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/448,220

(22) Filed: Nov. 23, 1999

(30) Foreign Application Priority Data

Nov. 30, 1998 (JP) .......................................... 10-339537

(51) Int. Cl.[7] ................................................ G06F 11/00

(52) U.S. Cl. ............................... 714/8; 714/7; 714/710

(58) Field of Search ............................. 714/5, 6, 7, 8, 714/710; 711/114; 369/30.28, 30.22

(56) References Cited

U.S. PATENT DOCUMENTS

| | | | |
|---|---|---|---|
| 4,984,230 A | * 1/1991 | Satoh et al. | 369/53.17 |
| 5,258,984 A | * 11/1993 | Menon et al. | 714/7 |
| 5,297,148 A | * 3/1994 | Harari et al. | 365/185.09 |
| 5,497,457 A | * 3/1996 | Ford | 714/15 |
| 5,752,257 A | * 5/1998 | Ripoll et al. | 711/114 |
| 5,895,493 A | * 4/1999 | Gatica | 707/201 |
| 6,006,308 A | * 12/1999 | Matsunami et al. | 711/112 |
| 6,041,421 A | * 3/2000 | Yamamoto | 714/7 |
| 6,160,778 A | * 12/2000 | Ito et al. | 369/275.3 |
| 6,351,825 B1 | * 2/2002 | Kaneda et al. | 360/98.04 |
| 6,366,982 B1 | * 4/2002 | Suzuki et al. | 711/114 |
| 6,367,038 B1 | * 4/2002 | Ko | 369/53.16 |

OTHER PUBLICATIONS

Ford et al., "Redundant Arrays of Independent Libraries (RAIL): A Tertiary Storage System", Compcon '96. 'Technologies for th Information Superhighway' Digest of Papers, 1996, pp.: 280–285.*

Muntz et al., "Analysis of striping techniques in robotic storage libraries", Mass Storage Systems, 1995. 'Storage—At the Forefront of Information Infrastructures', Proceedings of the Fourteenth IEEE Symposium on, 1995, pp.: 225–238.*

Tanabe et al., "Redundant optical storage system using DVD–RAM library", Mass Storage Systems, 1999. 16th IEEE Symposium on , 1999, pp.: 80–87.*

* cited by examiner

Primary Examiner—Robert Beausoleil
Assistant Examiner—Gabriel Chu
(74) Attorney, Agent, or Firm—Morrison & Foerster (57) ABSTRACT

For each of a plurality of media that are to be simultaneously subjected to a data striping process, a management region is provided where data can be saved separately from an existing substitute sector. When some defect or trouble is found in any one of the media and there is no available substitute sector in that trouble-plagued medium, the data striping process can be carried on, without suspension, by using the management region for data writing purposes. Such arrangements can supplement the capacity of data areas of the substitute sector, which thus allows the data striping process to be appropriately carried on even when the capacity of the substitute sector has been used up. Further, by setting the management region for each of media within a same volume and storing common management information redundantly in the individual management regions, it is possible to avoid unstableness of the media management that would be encountered due to use of non-fixed, transportable media. Further, because the capacity of the management regions can be set as desired by a user, the user can readily know the thus-set capacity whenever necessary, and thus it is possible for the user to ascertain presence of any necessary empty area prior to the data write processing.

16 Claims, 4 Drawing Sheets

MEDIA LIBRARY APPARATUS AND METHOD OF CONTROLLING THE MEDIA LIBRARY APPARATUS

BACKGROUND OF THE INVENTION

The present invention relates generally to media library apparatus based on a so-called RAID scheme and methods of controlling the media library apparatus. More particularly, the present invention relates to an improved media library apparatus and method of controlling the media library apparatus which can enhance efficiency of data write processing on media by allowing the write processing to continue even after all substitute sectors of the media are used up.

Figure 4:
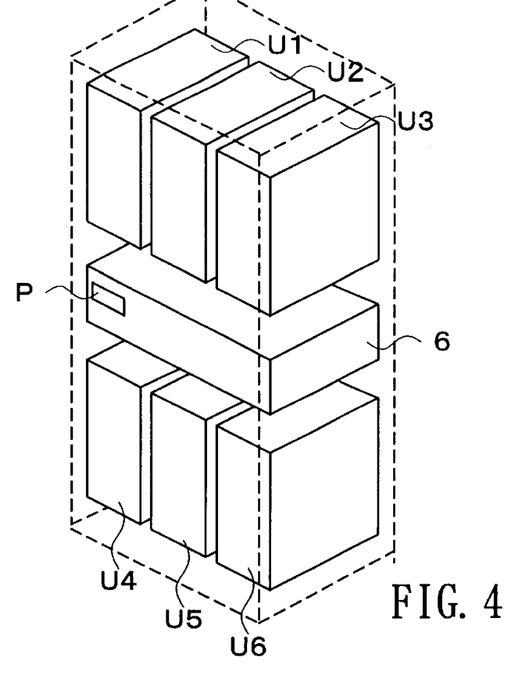
FIG. 4 is a perspective view showing a general construction of a conventionally-known library apparatus.

Library apparatus for handling recording media organized in RAID (acronym for "Redundant Array of Inexpensive Disks") arrays have been known extensively today. In a typical example of such library apparatus, as shown in FIG. 4, a plurality of (six in the illustrated example) library units U1–U6 are simultaneously activated in response to data read/write control instructions (e.g., in the form of an electric signal), given from a not-shown higher-order processor such as a personal computer or via a control panel P, so as to carry out data read/write processing while performing a so-called "data striping process" on media inserted in respective drive devices of the library units U1–U6. Namely, a RAID controller 6 of the library apparatus issues control instructions, in response to which each of the library units U1–U6 uses its holder/transporter to automatically transport a designated medium from one of a multiplicity of storage shelves or cells to the associated drive device. After completion of the media transportion within all the library units U1–U6, the drive devices are activated in a parallel fashion in order to carry out the data read/write processing while performing the data striping process. The above-mentioned RAID controller 6, which comprises a microcomputer including a MPU, a ROM, a RAM (all not shown), etc., controls the transportation of the media by the holder/transporters and also controls the data read/write processing by the parallelly-driven drive devices.

In the above-mentioned "data striping process", each complete data is broken down into a plurality of lower-order units called "stripe units" each having a predetermined data size such as a bit, byte or predetermined data block, and the thus-obtained stripe units are then circulatively delivered to the individual drive devices so that the stripe units are written distributively across the media inserted in the respective drive devices. In both the data read processing and the data write processing during the data striping, a plurality of the media to be processed concurrently are accessed simultaneously while being regarded as a single medium. By thus operating the plurality of drive devices in a parallel or concurrent fashion, the conventional media library apparatus have been attempting to substantially increase a data transmission speed in accessing a large quantity of data. However, reliability of the library apparatus would unavoidably deteriorate as the number of the drive devices to be operated in parallel increases. Thus, more sophisticated disk array apparatus have been proposed to date, which are designed to achieve higher reliability by employing redundancy information; for example, duplicate copying of data in the case of RAID level 1, data redundancy by Hamming code in the case of RAID level 2, or data redundancy by parity in the case of RAID level 3. Such sophisticated disk array apparatus employing the redundant information are also commonly called RAID (Redundant Array of Inexpensive Disks) handling apparatus.

The conventionally-known RAID library apparatus are also arranged in such a manner that in case a trouble, i.e., an abnormal condition, such as a malfunction or complete failure (e.g., access error), occurs in any one of the media on which the data read/write processing is being performed concurrently, the data and redundancy information are read out from all the other concurrently-processed media free of trouble and then a predetermined data recovery process is performed, on the basis of the read-out data and redundancy information, to recover the data of the medium where there has occurred the trouble or abnormal condition. In addition, the conventionally-known RAID library apparatus use hard disks as the media, but none of them use non-fixed, transportable media.

Although DVDs (Digital Versatile Disks) have been used more and more popularly as high-density digital recording media in recent years, there has not yet been proposed an efficient RAID library apparatus that uses such DVD media. Further, management of abnormal data etc. in the conventional RAID library apparatus has been made using only one management region.

Disk-shaped recording media, such as the above-mentioned DVDs and optical disks, generally have a plurality of tracks formed concentrically or helically about their rotational axis, and each of these tracks is divided into a predetermined number of "sectors" having an uniform circumpherential length. To write or read data to or from such a medium, access is made to data areas, one by one, partitioned into these sectors. Not all the tracks of the medium are usable by a user; namely, the data areas usable by the user (i.e., user data areas) are limited. Other tracks than the user data areas are used as a "substitute sector" (or spare sector) and the like; typically, the substitute sector is for usable as a substitute for a regular sector having been found to be defective in the user data areas. More specifically, the substitute sector on the medium is a data area limitedly allocated in advance and typically having a capacity of one or more regular sectors. Note that such a substitute sector, in general, is used only in a medium where a decificient regular sector has been found, independently of RAID processing.

When some trouble (i.e., defect) has been detected in one of the regular sectors of any one of the media during the data write processing, the data is written into the substitute sector in place of the defective sector. However, in a situation where other data have already been written in the entire area of the substitute sector of the medium, i.e., where there is no empty or unused area left in the substitute sector of the medium, the data write processing can not be performed at all any longer even though one or more other data areas in the medium are still empty.

Namely, the conventionally-known RAID library apparatus would present the problem that they can not be used as RAID handling apparatus unless there is an empty area in the substitute sector in every one of the media on which the data write processing is to be performed. For example, once any one of the media has run out of empty area in the substitute sector during the data write processing, the RAID library apparatus would undesirably halt or suspend the write processing even though the data write processing has not yet been completed. In such a case, there arises a need to replace the medium, having run out of empty area in its substitute sector, with a new one and then restart the data write processing from the beginning. Thus, an enormous amount of time has to be spent in completing the data write processing and no other operations can not be performed at all during all these processing, which would result in a very poor overall processing efficiency of the library apparatus.

Further, with the conventionally-known RAID library apparatus, it was not possible f or the user to know, prior to the data write processing, a size of empty areas present in the substitute sector. Therefore, it was not possible to readily predict when the substitute sector would be used up during the course of the data write processing.

SUMMARY OF THE INVENTION

It is therefore an object of the present invention to provide a media library apparatus and method of controlling the media library apparatus which achieve reliable management of data indicative of trouble, defects or the like of the media and which also achieve an enhanced efficiency of data write processing on the media by allowing the data write processing to continue even after empty areas of a substitute sector in any one of the media is used up.

To accomplish the above-mentioned object, the present invention provides a media library apparatus which comprises: a transportation mechanism that transports a transportable medium; a storage section that stores a plurality of transportable media; a plurality of drive devices each of which reads or writes desired data on a selected one of the media; and a controller which causes a group of the media that are to be simultaneously subjected to a data striping process to be inserted in the plurality of drive devices, said controller controlling operation of the plurality of drive devices, in a parallel fashion, so as to perform the data striping process on the media inserted in the drive devices, wherein, for each of the media that are to be simultaneously subjected to the data striping process, a management region is set to store common management information, and wherein the controller obtains representative management information, in accordance with a predetermined criteria, from among the management information stored in respective ones of the management regions of the media that are to be simultaneously subjected to the data striping process and performs processing based on the obtained representative management information.

According to another aspect of the present invention, there is provided a media library apparatus which comprises: a transportation mechanism that transports a transportable medium; a storage section that stores a plurality of transportable media; a plurality of drive devices each of which reads or writes desired data on a selected one of the media; and a controller which causes a group of the media that are to be simultaneously subjected to a data striping process to be inserted in the plurality of drive devices, said controller controlling operation of the plurality of drive devices, in a parallel fashion, so as to perform the data striping process on the media inserted in the drive devices, wherein a predetermined substitute sector is formatted in each of the media, and when a defective sector is found in a user data area of the medium, the substitute sector is used in place of the defective sector, wherein for each of the media that are to be simultaneously subjected to the data striping process, a data-storing management region is set separately from the substitute sector, and wherein the controller performs control such that when there arises a situation where desired data can not be written onto any one of the media in data write processing based on the data striping process, the data write processing can be carried on using the management region.

According to the present invention arranged in the above-mentioned manner, even when all empty areas have been used up in the substitute sector of a particular one of the media, which are to be simultaneously processed, during the course of the data write processing including a data recovery process, the data write processing can be carried on appropriately without suspension, using the management region of thr particular medium. Namely, in case there is found a defective sector in any one of the media where desired data is to be written, the controller writes the desired data into the substitute sector of that media. If, however, too many regular sectors are defective, empty areas gradually run out in the substitute sector, as a result of which data can not be written into the substitute sector any longer. In such a case, the controller writes the data into the management region by determining that no more data writing can be made to the substitute sector, and later reads out the desired data from the management region when readout of such data is instructed. Thus allowing the management region to have the function as the substitute sector can effectively supplement the limited capacity of data areas of the substitute sector, which, in turn, allows the data striping process to be appropriately carried on even after the capacity of the substitute sector has been used up. Further, because the capacity of each of the management regions, unlike the substitute sectors, can be set as desired by a user and hence the user can readily know the capacity, it is possible for the user to ascertain presence/absence of any necessary empty area prior to the data write processing. However, the management regions may of course be pre-formed in the media rather than being set by the user.

A plurality of the management regions may be set redundantly in each of the media. It is possible that some defective sector occurs even in the management region, in which case no data can of course be written into the management region. Even in such a case, the redundant provision of two or more management regions for each of the media allows the data to be written into any other management region than the defective one and thereby can enhance the data integrity. Generally, in the RAID library apparatus, processing can be performed while optionally switching the medium to be processed from one medium to another. Because the number of deficient regular sectors differs among the media, the quantity of data written into the substitute sector also differs from one medium to another. Thus, by retaining the management information common to all the media that are to be simultaneously subjected to the data write processing, the present invention can properly deal with an interchange between the media.

In each of the management regions, there may be stored count information that is incremented each time the medium is loaded or unloaded to or from the drive device. In a situation where the management information of the media within a same volume fails to coincide with each other, the management information having the count information of a greatest value is regarded as a newest or latest valid value. Namely, when a given new medium has replaced another medium in the media library apparatus, the management information of the new medium is not used because its count information is still small in value. Then, the management information of any one of the other or older media is copied into the new medium; namely, the management information is updated. For this purpose, data necessary for the updating the management information is retrieved from the management information of the medium which has the newest count information.

Furthermore, according to the present invention, each of the above-mentioned non-fixed, transportable media may be transferred to and from the transportation mechanism and transported by its holder/transporter while being supported on a separate carrying support such as a tray; thus, the present invention can be constructed as a DVD (Digital Versatile Disk) library apparatus. Specifically, in most cases, tray-like carrying supports are provided for disk-shaped media, such as DVDs and CDs (Compact Disks), in a one-to-one relation (i.e., one carrying support per disk), and these disk-shaped media are each stored and, whenever necessary, transported together with the carrying support as a unit. Note that the carrying supports may be in the form of cartridges or the like other than the trays.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Fundamental hardware setup of a media library apparatus to which is applied the concepts of the present invention may be generally the same as shown in FIG. 4. Namely, the media library apparatus in accordance with a preferred embodiment includes a plurality of (six in the illustrated example) library units U1–U6 that are simultaneously activated in response to data read/write control instructions, given from a not-shown higher-order processor such as a personal computer, so as to carry out data read/write processing on media inserted in respective drive devices (shown in FIG. 5) of the library units U1–U6. The media library apparatus also includes a RAID controller 6 that issues control instructions, in response to which each of the library units U1–U6 uses its holder/transporter (shown in FIG. 5) to automatically transport a designated medium from one of a multiplicity of storage shelves or cells to the associated drive device. After completion of the media transportation within all the library units U1–U6, the drive devices are activated concurrently in a parallel fashion in order to carry out the data read/write processing while performing the "data striping process". The above-mentioned RAID controller 6, which typically comprises a microcomputer including a MPU, a ROM, a RAM, controls the transportation of the media by the holder/transporters, as well as the parallel data read/write processing by the drive devices.

Figure 5:
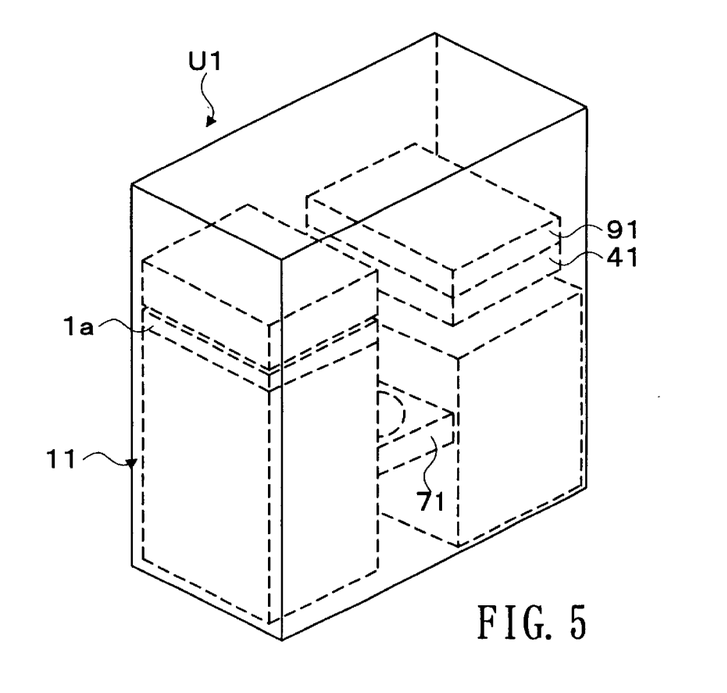
FIG. 5 is an enlarged perspective view showing a general construction of one of a plurality of library units shown in FIG. 4.

FIG. 5 is an enlarged perspective view showing a general construction of one of a plurality of library units U1 to U6 shown in FIG. 4; note that only the library unit U1 is shown in FIG. 5 because the other library units U2 to U6 are each identical in construction to the library unit U1. Each of the library units U1 to U6 includes the holder/transporter 71 for holding and transporting a designated medium to a designated place within the library unit, a storage section 11 having a multiplicity of storage shelves 1a for storing a multiplicity of media (only one shown for simplification of the illustration), and at least one drive device 41 for writing or reading data to or from a medium inserted therein.

In response to data read/write control instructions (e.g., in the form of an electric signal) given to the RAID controller 6 via a control panel P or from a not-shown higher-order processor (e.g., personal computer), the media library apparatus simultaneously activates the six library units U1 to U6 so as to simultaneously carry out the data read/write processing on media inserted in the respective drive devices 41 while performing the conventional data striping process on the inserted media. More specifically, each of the library units U1 to U6 has a control section 91, which, on the basis of the control instructions from the RAID controller 6 of the library apparatus, takes out a designated medium from a predetermined one of the storage shelves 1a in the storage section 11. Then, the control section 91 controls the holder/transporter 71 to transport the taken-out designated medium to the drive device 41 and, after the necessary transportation, controls the drive device 41 to carry out the data read/write processing on the medium. Namely, each of the library units U1 to U6 is constructed to perform the data read/write processing on the designated medium independently of the other library units.

Although the media library apparatus according to the preferred embodiment is shown and described here as including the holder/transporter 71 for each of the library units, only one holder/transporter 71 may be provided in the entire media library apparatus for shared use among these library units U1–U6.

Figure 1:
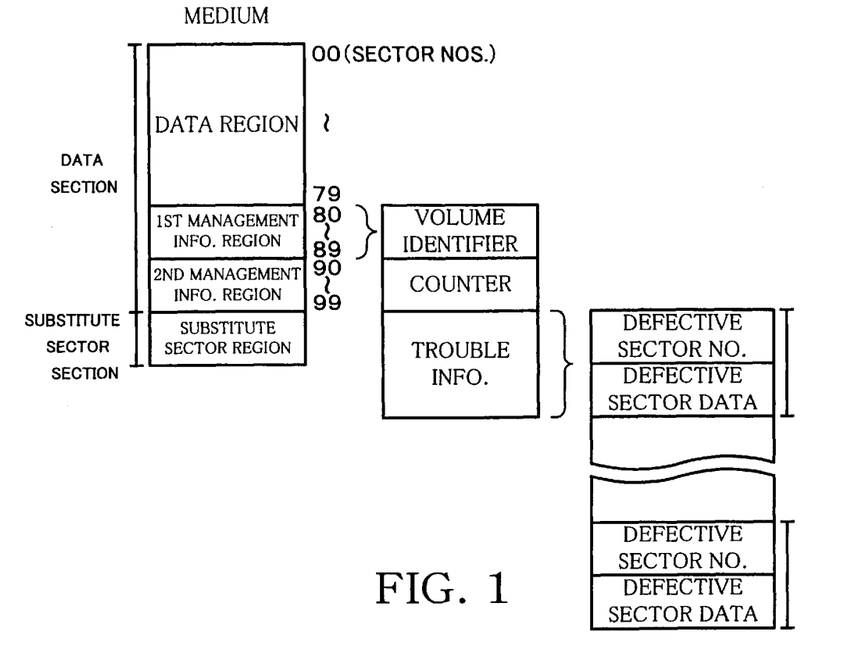
FIG. 1 is a diagram conceptually showing an example data organization on a medium employed in a media library apparatus in accordance with a preferred embodiment of the present invention.

FIG. 1 is a block diagram conceptually showing an example data organization on each of recording media employed in the media library apparatus in accordance with the preferred embodiment of the present invention. The data organization on each of the media can be classified under two major sections, i.e., a data section and a substitute sector section. Further, the data section includes four major regions, i.e., a data region, a first management information region, a second management information region and a substitute sector region. The data region is one which is first accessed when data is to be written and where the data is actually written as long as there is no trouble, i.e., abnormal condition or defect, in the region. The above-mentioned substitute sector region is where data is written as a substitute for the data region when there is found a trouble-plagued area, i.e., a defective sector. Namely, the substitute sector region can be said to be an auxiliary or spare data region functioning as an insurance against a possible failure in the regular data region. However, in the present invention, a user is not allowed to designate the substitute sector region for data writing. The first and second management information regions of the data section each include a volume identifier, a counter, and trouble information containing a defective sector number and defective sector data; that is, each of the first and second management information regions retains exactly the same data contents. The above-mentioned volume identifier is a same number (e.g., integral number) that is imparted to all media on which same data has been written at the same time; thus, with the volume identifier, it is possible to ascertain whether or not a given group of media have been processed simultaneously. The counter is incremented in its value by one each time data of the first or second management information region is loaded or unloaded, i.e., written or read, to or from the medium. The defective sector number is indicative of a particular area of the data region which has an abnormal condition (i.e., defective sector), and the defective sector data is one which was to be written into the defective sector indicated by the defective sector number.

As the sector number, a different or unique number, e.g., in the range of "100"–"699", is allocated to each data area of the medium except for those of the substitute sector region. Because, in the described preferred embodiment, the data read/write processing is performed concurrently on a plurality of the media while regarding them as a single medium, the highest place of each sector number specifies a particular one of the drive devices where the medium in question has been inserted, and the lower two places of the sector number specifies the location of the sector within the medium. Namely, the highest-place numbers "1"–"6" are allocated sequentially to the respective media inserted in the drive devices of the library apparatus, the lower-place numbers "00"–"79" are allocated sequentially to the regular sectors in the data region of the medium, and also the lower-place numbers "80"–"89" and "90"–"99" are allocated sequentially to the sectors in the first and second management information regions, respectively of the medium. Therefore, the sector number "481", for example, designates the 81st sector of one of the media inserted in the drive device of the library unit U4, i.e., the first sector in the management first information management region. The sector numbers used in the present invention are, of course, not limited to the above-mentioned and more precise or detailed unique sector numbers may be allocated to the individual sectors depending on the intended application.

Figure 2A:
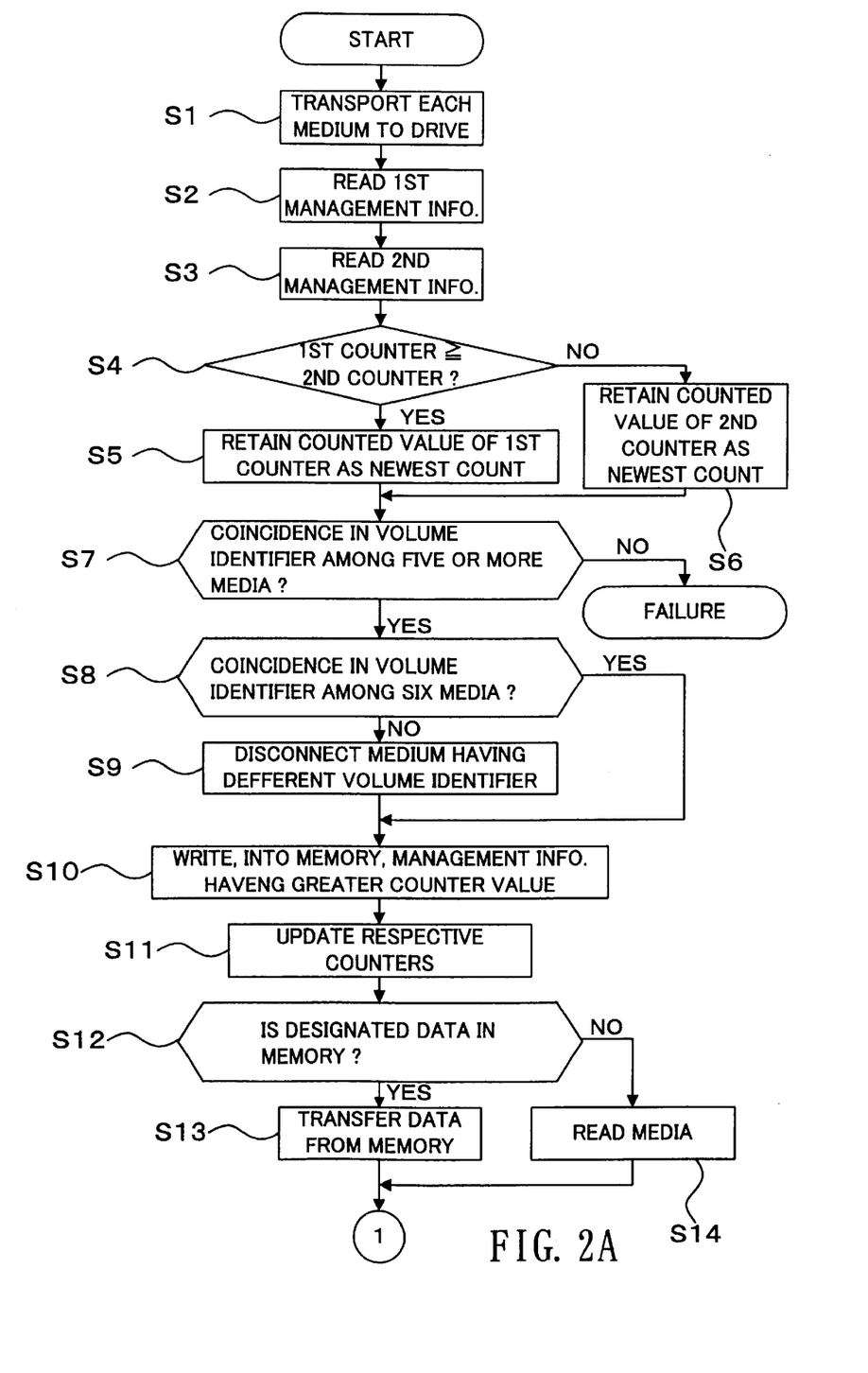
FIG. 2A is a flow chart showing part of data write processing performed in the embodiment under control of a RAID controller.
Figure 2B:
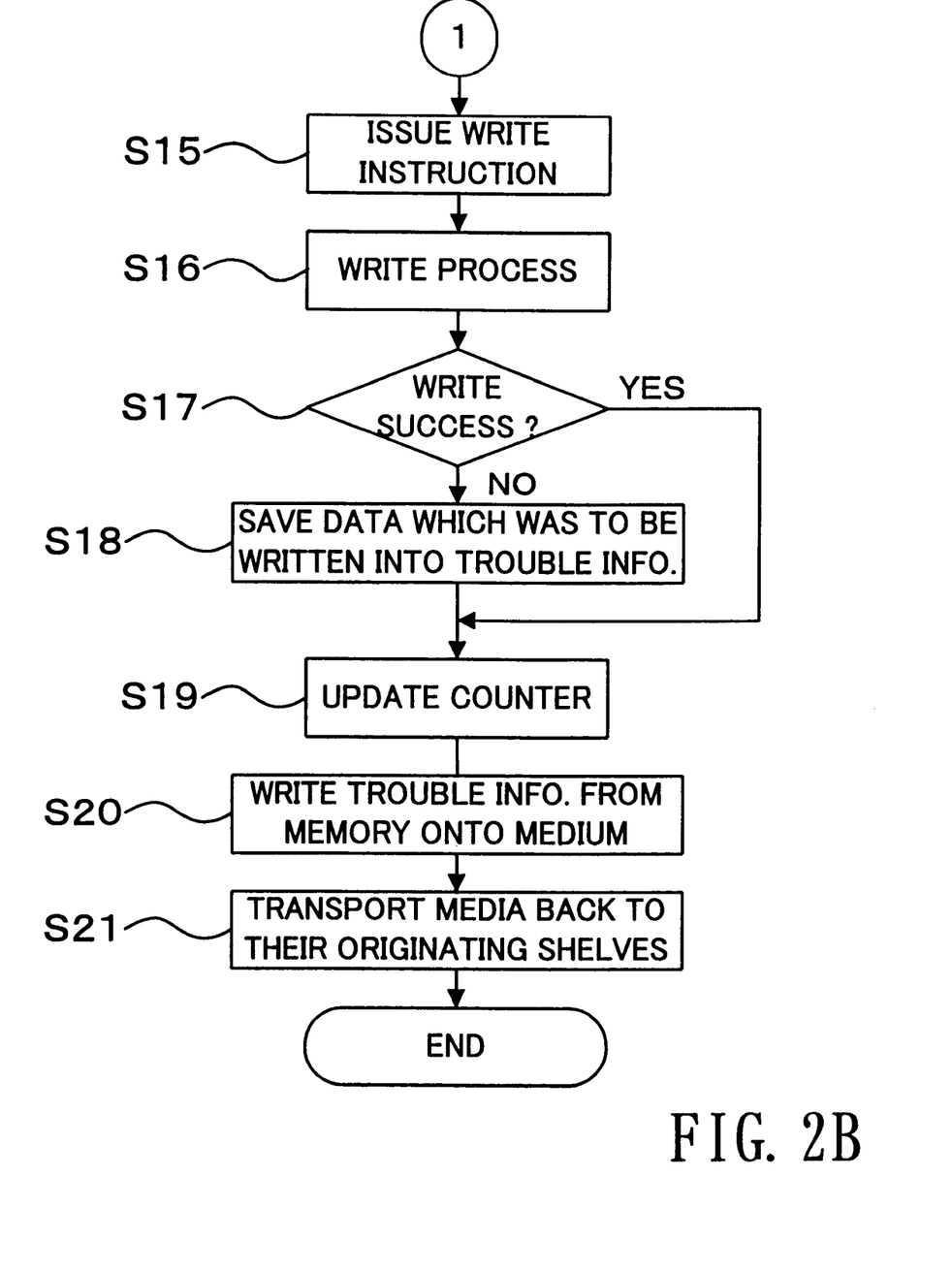
FIG. 2B is a flow chart showing a remaining part of the data write processing shown in FIG. 2A.

FIGS. 2A and 2B are flow charts which together show an example operational sequence of the data write processing performed in the preferred embodiment under control of the RAID controller 6. The control routine shown in FIGS. 2A and 2B is activated or caused to start when a predetermined condition is met, e.g., when data write instructions are received from the higher-order processor or from the control panel P manipulated by the user. At fist step S1, desired media are selectively taken out of the respective storage shelves in all the library units U1–U6 and then transported to and inserted in the associated drive devices. Then, for each of the media inserted in the drive devices, data in both the first management information region and the second management information region are read out at steps S2 and S3, respectively. Next, a comparison is made at step S4 between the respective counters (first and second counters) of the first and second management information regions, so that one of the counted values of the counters (first or second counter) which is greater than the other is retained in a memory as a newest count at step S5 or S6. Namely, although the counted values of the counters in the first and second management information regions should, in principle, be identical to each other, they may differ from each other when there is some trouble or defect in the medium, in which case the greater counted value is retained in the memory with priority over the smaller counted value. Because the counter of each of the first and second management information regions is updated each time the drive device makes access to the medium, latest data is always written in either one of the first and second management information regions which has the greater counter-counted value. Therefore, for each of the media inserted in the drive devices, a determination is made as to which of the first and second management information regions the latest information is retained in, or as to whether the latest information is retained in both of the first and second management information regions.

At step S7 following step S5 or S6, it is determined whether or not there is a match or coincidence among the volume identifiers in five or more of the media inserted in the respective drive devices. If answered in the negative (NO) at step S7, the current processing is terminated immediately without performing any other operations. If, on the other hand, an affirmative (YES) determination is made at step S7, i.e., if there is a match or coincidence among the volume identifiers in five or more of the media, a further determination is made at step S8 as to whether there is also a match among the volume identifiers in all the six inserted media. With an affirmative answer at step S8, the processing moves on to step S10. If, however, a match is found among the volume identifiers only in five of the inserted six media (NO determination at step S8), the processing goes to step S10 after, at step S9, disconnecting, from the RAID controller, the drive device where is inserted the medium having the volume identifier that is different from those of the media in the other drive devices. At step S10, regarding the media with the same volume identifier, the first or second management information region of the medium whose latest counter-counted value is the greatest is stored into the memory. Then, at step S11, the respective counters of the media inserted in the individual drive devices are each updated to a value equal to the greatest counter-counted value plus one.

Generally, in the RAID library apparatus, as described earlier, same data divided into a plurality of stripe units is stored distributively across a plurality of media, and a same volume identifier is imparted to all the data-striped media (i.e., all these media having been used simultaneously in the same data write processing). In other words, one and the same volume identifier is attached to a group of the media simultaneously used in the same data write processing. However, in a data recovery process that would become necessary when one of the media has failed or got into an abnormal condition, only one of the media inserted in the individual drive devices may have a different volume identifier from those of the other drive-inserted media. This is because the data write processing is allowed to continue as a result of the affirmative determination at step S7, i.e., on condition that there is a match in the volume identifier among the five or more of the drive-inserted media.

Then, upon receipt of data read instructions from the higher-order processor or from the control panel P manipulated by the user, it is ascertained at step S12 whether or not the data designated by the instructions is the one held in the memory. If answered in the affirmative at step S12, i.e., if the sector from which the data is to be read out is a defective sector and the data which is to be written into the defective sector is currently in the first or second management information region rather than in the substitute sector, then the data held in the memory is transferred to the higher-order processor at step S13. If, on the other hand, the data designated by the instructions is not the one held in the memory as determined at step S12 (i.e., negative or NO determination at step S12), namely, if the sector from which the data is to be read out is not a defective sector or if the sector from which the data is to be read out is a defective sector and the designated data is in the substitute sector, then the data is read out from the media inserted in the individual drive devices and then transferred to the higher-order processor at step S14.

Figure 3:
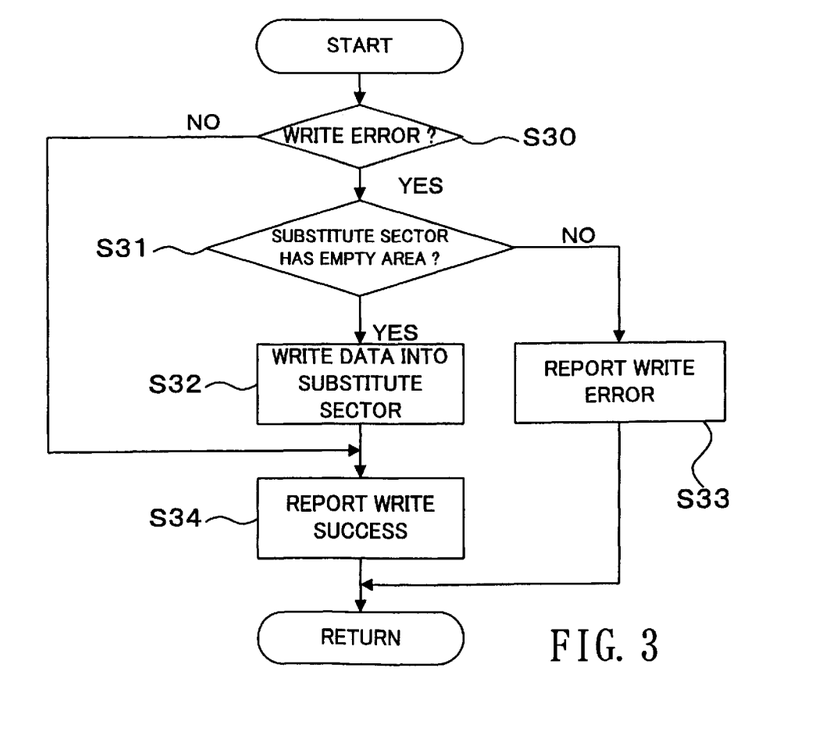
FIG. 3 is a flow chart showing an example of a write process performed in the data write processing of FIGS. 2A and 2B.

Referring now FIG. 2B, write instructions are sent to the individual drive devices at step S15, so that write processing is carried out at step S16 in the drive devices concurrently in a parallel fashion. FIG. 3 is a flow chart showing an example of a write process thus performed at step S16 in each of the drive devices.

At step S30 of the write process, a determination is made as to whether desired data has been appropriately written, with no write error, into the data region of the medium inserted in the drive device. If the data has been appropriately written with no write error, a negative (NO) determination is made at step S30, and the processing goes to step S34 to issue a write success signal. If, on the other hand, the data has not been appropriately written, an affirmative (YES) determination is made at step S30 and if there is an empty, i.e., available, area in the substitute sector region in the medium (YES determination of step S31), the processing proceeds to step S32 to write the data into the substitute sector region and then issues the write success signal at step S34. Further, if there is no empty area in the substitute sector region (NO determination of step S31), a write failure signal is issued at step S33 because the data can not be written into the substitute sector region either. Namely, the write success signal is issued when the data has been successfully written in the data or substitute sector region, while the write failure signal is issued when the data has not been successfully written in either the data region or the substitute sector region.

After the write success signal or write failure signal has been issued through the above-described operations, the processing loops back to step S17 of FIG. 2B in order to determine whether the write process has been completed properly, i.e., whether the signal issued at the time of data writing into the data region or substitute sector region is the write success signal or the write failure signal. If the write process has not been completed properly, i.e., the write failure signal has been issued (NO determination at step S17), it means that there is some trouble or defect in the data region and the substitute sector region has no empty area, so that the data, which was to be written by the current write process, is written, as deficient sector data, into the management information stored in the memory and the sector number of the defective sector is also written, as a deficient sector number, into the management information at step S18. If, on the other hand, the write process has been completed properly, i.e., the write success signal has been issued (YES determination at step S17), it means that the data in question has already been written into the data region or substitute sector region, so that an operation of Step S19 is carried out without the data being written into the management information stored in the memory at step S18. Once all the designated data have been written onto the medium (the data region or the substitute sector region) or into the memory (the management information), a value "1" is added to the counter of the management information in the memory at step S19. After that, all the management information (including the count information and trouble information) in the memory is written at step S20 into the first and second information regions in the memory. After the writing at step S21, all the media, having been so far inserted in the drive devices, are transported from the drive drives back to their respective originating storage shelves at step S21.

Whereas the preferred embodiment of the present invention has been described above as performing the foregoing control operations by means of the RAID controller, the present invention is not so limited and these control operations may be performed via a microcomputer of the higher-order processor which includes a MPU, ROM and RAM.

In summary, the present invention, as has been described so far, is characterized in that the management region is set for each medium within the same volume and common management information is stored in all the management regions for the media within the same volume, and thus the present invention can effectively avoid unstableness in the management that would be encountered due to use of the non-fixed, transportable media. Further, because the present invention allows the data write processing to continue without suspension even after all empty areas in the substitute sector region are used up in any one of the media during the course of the write processing, it can significantly enhance the efficiency of the data write processing. Furthermore, because the user is allowed to ascertain, prior to the data write processing, presence of an empty area in the substitute sector region, the present invention can even further enhance the efficiency of the data write processing.

What is claimed is:

1. A media library apparatus comprising:

a transportation mechanism that transports a transportable medium;

a storage section that stores a plurality of transportable media;

a plurality of drive devices each of which reads or writes desired data on a selected one of the media; and a controller which causes a group of the media that are to be simultaneously subjected to a data striping process to be inserted in said plurality of drive devices, said controller controlling operation of said plurality of drive devices, in a parallel fashion, so as to perform the data striping process on the media inserted in said drive devices, wherein, for each of the media that are to be simultaneously subjected to the data striping process, a management region is set to store common management information, and wherein said controller obtains representative management information, in accordance with a predetermined criteria, from among the management information stored in respective ones of the management regions of the media that are to be simultaneously subjected to the data striping process and performs processing based on the obtained representative management information.

2. A media library apparatus as claimed in claim 1 wherein when the management information stored in any one of the management regions is to be updated, said controller performs control such that the common management information is updated for all the media that are to be simultaneously subjected to the data striping process.

3. A media library apparatus as claimed in claim 1 wherein a plurality of the management regions are set for each of the media and the common management information is stored in each of the management regions.

4. A media library apparatus as claimed in claim 1 wherein the management information to be stored in the management region contains volume identification information to be imparted to each of the media that are to be simultaneously subjected to the data striping process, and trouble information pertaining to a trouble having occurred in the media within a same volume.

5. A media library apparatus as claimed in claim 4 wherein the management information further contains count information indicative of a total number of loading and/or unloading of the medium to said drive device having been made so far, and the trouble information contains information indicative of a defective location of the medium where there has occurred trouble and the data that was to be written into the defective location.

6. A media library apparatus as claimed in claim 1 wherein said controller performs control such that when there arises a situation where desired data can not be written onto any one of the media in data write processing based on the data striping process, the data write processing can be carried on using the management region.

7. A media library apparatus as claimed in claim 1 wherein the management information to be stored in the management region contains count information indicative of a counted number of loading and/or unloading of the medium to said drive device having been made so far, and said controller uses, as representative management information, the management information stored in the management region of one of the media of which the count information presents a value greater than the other media.

8. A media library apparatus comprising:
a transportation mechanism that transports a transportable medium;
a storage section that stores a plurality of transportable media;
a plurality of drive devices each of which reads or writes desired data on a selected one of the media; and
a controller which causes a group of the media that are to be simultaneously subjected to a data striping process to be inserted in said plurality of drive devices, said controller controlling operation of said plurality of drive devices, in a parallel fashion, so as to perform the data striping process on the media inserted in said drive devices,
wherein a predetermined substitute sector is formatted in each of said media, and when a defective sector is found in a user data area of the medium, the substitute sector is used in place of the defective sector,
wherein for each of the media that are to be simultaneously subjected to the data striping process, a data-storing management region is set separately from the substitute sector, and
wherein said controller performs control such that when there arises a situation where desired data can not be written onto any one of the media in data write processing based on the data striping process, the data write processing can be carried on using the management region.

9. A media library apparatus as claimed in claim 8 wherein the management region includes areas for storing information indicative of a defective location of the medium where there has occurred trouble and the data that was to be written into the defective location.

10. A media library apparatus as claimed in claim 9 wherein the management region also includes areas for storing volume identification information with a same volume identification number imparted to each of the media that are to be simultaneously subjected to the data striping process, and count information indicative of a counted number of loading and/or unloading of the medium to said drive device having been made so far.

11. A media library apparatus as claimed in claim 8 wherein said controller performs control such that when there arises a situation where desired data can not be written onto any one of the media in the data write processing based on the data striping process, the data to be written onto the one medium is written into all the management regions of the media that are to be simultaneously subjected to the data striping process.

12. A media library apparatus as claimed in claim 11 wherein a plurality of the management regions are set for each of the media and common data is written into each of the management regions.

13. A media library apparatus as claimed in claim 8 wherein in a data recovery process, said controller reads out and uses the data stored in one of the management regions of the media that are to be simultaneously subjected to the data striping process.

14. A media library apparatus as claimed in claim 13 wherein count information indicative of a counted number of loading and/or unloading of the medium to said drive device having been made so far is stored in the management region, and in the data recovery process, said controller reads out and uses the data stored in the management region of one of the media of which the count information presents a value greater than the other media.

15. A method of controlling a media library apparatus comprising: a transportation mechanism for transporting a transportable medium; a storage section for storing a plurality of transportable media; a plurality of drive devices each provided for reading or writing desired data on a selected one of the media; and a controller for causing a group of the media that are to be simultaneously subjected to a data striping process to be inserted in said plurality of drive devices and controlling operation of said plurality of drive devices, in a parallel fashion, so as to perform the data striping process on the media inserted in said drive devices, said method comprising:
a first step of setting a data-storing management region for each of the media that are to be simultaneously subjected to the data striping process; and
a second step of performing control such that when there arises a situation where desired data can not be written onto any one of the media in data write processing based on the data striping process, the data to be written onto the one medium is written into the management regions of all the media that are to be simultaneously subjected to the data striping process, to thereby allow the data write processing to be carried on without suspension.

16. A method as claimed in claim 15 wherein a predetermined substitute sector is formatted in each of said media, and when a defective sector is found in a user data area of the medium, the substitute sector is used in place of the defective sector, and
wherein said second step performs control such that when there arises a situation where desired data can not be written onto any one of the media in the data write processing based on the data striping process, the data write processing can be carried on using the management region.

* * * * *